(12) United States Patent
Brahm et al.

(10) Patent No.: US 7,460,653 B2
(45) Date of Patent: *Dec. 2, 2008

(54) APPARATUS AND METHODS FOR TELECOMMUNICATION AUTHENTICATION

(75) Inventors: David Brahm, Santa Barbara, CA (US); David Trandal, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 693 days.

This patent is subject to a terminal disclaimer.

(21) Appl. No.: 10/385,204

(22) Filed: Mar. 7, 2003

(65) Prior Publication Data

US 2004/0174965 A1 Sep. 9, 2004

(51) Int. Cl.
*H04M 1/64* (2006.01)

(52) U.S. Cl. .............................. 379/88.19; 379/142.05; 379/201.01; 379/210.01; 705/26; 705/67

(58) Field of Classification Search ............ 379/142.05, 379/88.19, 210.01; 705/67, 26
See application file for complete search history.

(56) References Cited

U.S. PATENT DOCUMENTS

| | | | |
|---|---|---|---|
| 4,994,926 A | 2/1991 | Gordon et al. | |
| 5,291,302 A | 3/1994 | Gordon et al. | |
| 5,459,548 A | 10/1995 | Matsuda et al. | |
| 5,459,584 A | 10/1995 | Gordon et al. | |
| 5,467,388 A | 11/1995 | Redd, Jr. et al. | |
| 5,533,102 A | 7/1996 | Robinson et al. | |
| 5,577,111 A | 11/1996 | Iida et al. | |
| 5,651,054 A | 7/1997 | Dunn et al. | |
| 5,668,861 A | 9/1997 | Watts | |
| 5,805,587 A | 9/1998 | Norris et al. | |
| 5,809,128 A | 9/1998 | McMullin | |
| 5,825,867 A | 10/1998 | Epler et al. | |
| 5,835,573 A | 11/1998 | Dee et al. | |
| 5,884,032 A | 3/1999 | Bateman et al. | |
| 5,995,603 A * | 11/1999 | Anderson ............... 379/142.05 |
| 6,031,896 A | 2/2000 | Gardell et al. | |
| 6,035,031 A | 3/2000 | Silverman | |
| 6,169,795 B1 | 1/2001 | Dunn et al. | |
| 6,208,638 B1 | 3/2001 | Rieley et al. | |
| 6,282,276 B1 | 8/2001 | Felger | |
| 6,304,565 B1 | 10/2001 | Ramamurthy | |
| 6,310,939 B1 | 10/2001 | Varney | |
| 6,345,090 B1 | 2/2002 | Walker et al. | |
| 6,350,066 B1 | 2/2002 | Bobo, II | |
| 6,405,035 B1 | 6/2002 | Singh | |

(Continued)

FOREIGN PATENT DOCUMENTS

WO 00/60840 10/2000

*Primary Examiner*—Gerald Gauthier
(74) *Attorney, Agent, or Firm*—Knobbe, Martens, Olson & Bear LLP

(57) ABSTRACT

The present invention is related to telecommunications, and in particular to systems and methods of using telecommunication services for user authentication. Account information is stored for a user, the account information including at least a first phone number associated with the user. A user order is received. A verification phone call is received from the user, the call including charge phone number information. The charge number information is compared to the first phone number to authenticate that the user is associated with the first phone number. Based at least in part on the comparison, the user order is selectively caused to be fulfilled.

52 Claims, 7 Drawing Sheets

U.S. PATENT DOCUMENTS

| | | |
|---|---|---|
| 6,430,274 B1 | 8/2002 | Winstead et al. |
| 6,438,222 B1 | 8/2002 | Burg |
| 6,477,246 B1 | 11/2002 | Dolan et al. |
| 6,505,163 B1 | 1/2003 | Zhang et al. |
| 6,549,612 B2 | 4/2003 | Gifford et al. |
| 6,564,321 B2 | 5/2003 | Bobo, II |
| 6,643,034 B1 | 11/2003 | Gordon et al. |
| 6,690,785 B1 | 2/2004 | Stetler et al. |
| 6,738,461 B2 | 5/2004 | Trandal et al. |
| 6,751,299 B1 | 6/2004 | Brown et al. |
| 6,785,021 B1 | 8/2004 | Gordon et al. |
| 6,857,074 B2 | 2/2005 | Bobo, II |
| 6,879,677 B2 | 4/2005 | Trandal et al. |
| 6,898,275 B2 | 5/2005 | Dolan et al. |
| 6,968,174 B1 | 11/2005 | Trandal et al. |
| 6,981,214 B1 | 12/2005 | Miller et al. |
| 7,103,167 B2 | 9/2006 | Brahm et al. |
| 2001/0037264 A1* | 11/2001 | Husemann et al. ............ 705/26 |
| 2002/0010616 A1 | 1/2002 | Itzhaki |
| 2002/0097710 A1 | 7/2002 | Burg |
| 2002/0176558 A1 | 11/2002 | Tate et al. |
| 2003/0156700 A1* | 8/2003 | Brown et al. ............ 379/210.02 |
| 2004/0010472 A1* | 1/2004 | Hilby et al. .................... 705/67 |

* cited by examiner

Process Flow - Manual POTs Call

302B  Account owner call a toll free Service Provider telephone number
304B  CM answers the call and records the CN and optionally the CID
306B  CM verifies that PhoneNumber=CN of a valid Account
308B  CM informs the Account owner of authentication success or failure
310B  CM terminates the call with the Account owner

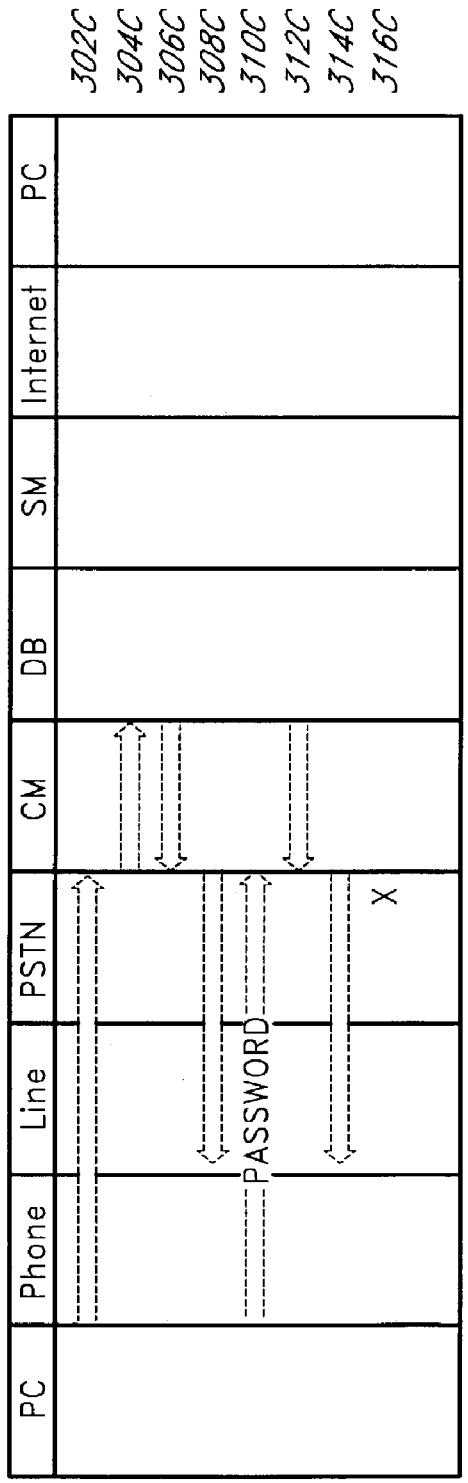

Process Flow — Manual POTs Call with Password

302C  Account owner calls a toll free Service Provider telephone number
304C  CM answers the call and records the CN and optionally the CID
306C  CM verifies that PhoneNumber=CN of a valid Account
308C  CM queries Account Owner for Password
310C  Account owner enters Password
312C  CM verifies that the Account Password is correct
314C  CM informs the Account owner of authentication success or failure
316C  CM terminates the call with the Account owner

FIG. 3C

APPARATUS AND METHODS FOR TELECOMMUNICATION AUTHENTICATION

BACKGROUND OF THE INVENTION

1. Field of the Invention

The present invention is related to telecommunications, and in particular to systems and methods of using telecommunication services for user authentication.

2. Description of the Related Art

As orders for services and products are increasingly made by phone or via the Internet, the opportunity for users to commit pranks and fraud has likewise increased. For example, one prank is to instruct a call processing service to have calls to the victim forwarded to another number. These pranks can be both annoying and expensive, and can reach the level of fraud or "cramming." Cramming occurs when a subscriber is billed for phone related services that the subscriber did not request, such as voice mail, paging, 900 number calls, and pay-per-call 800 numbers.

SUMMARY OF THE INVENTION

Embodiments of the present invention utilize telecommunication services to reduce the success of frauds, pranks and cramming, and to verify that orders for goods and services are legitimate. Thus, for example, embodiments of the present invention authenticate and verify that a user is associated with a phone number provided by the user when placing an order or when establishing an account. If the authentication or verification fails, the order can be rejected, thereby advantageously reducing the fulfillment of fraudulent orders or prank orders and further reducing the incidences of successful cramming.

One embodiment is a method of authenticating a user identity using telephony signaling, comprising: storing account information for a user, the account information including at least a first phone number associated with the user; receiving a user order; receiving a call from the user, the call including charge phone number information; comparing the charge number information with the stored first phone number to authenticate that the user is associated with the first phone number; and based at least in part on the comparison, selectively causing the user order to be fulfilled.

Another embodiment is a method of authenticating a user identity using telephony signaling, comprising: receiving from a first user a call handling instruction for calls placed to a first telephone number; causing a computer terminal associated with the first user to place a call to a second telephone number, the call including corresponding call signaling information; receiving the call and corresponding call signaling information; comparing at least a portion of the corresponding call signaling information with the first telephone number; and based at least in part on the comparison, determining if the call instruction is to be complied with.

Still another embodiment is a method of authenticating a caller identity using SS7 signaling, comprising: receiving a user order for at least one of a good and a service; requesting that the user provide a phone number associated with a first telephone line; instructing a client application executing on a user computer to initiate a call to a call processing system, the call associated with SS7 signaling information including caller-ID information and charge number information, wherein the user computer places the call using the first telephone line; verifying that at least one of the caller-ID information and charge number information corresponds to the phone number provided by the user; and providing the at least one of a good and a service at least partly in response to verifying that at least one of the caller-ID information and charge number information corresponds to the phone number provided by the user.

Yet another embodiment is a method of processing telephony signaling information, comprising: receiving a user order; requesting that the user provide a phone number associated with a first telephone line; initiating a call using the first telephone line to a call processing system, the call associated with signaling information including charge number information; verifying that the charge number information corresponds to the phone number provided by the user; and complying with the order at least partly in response to verifying that the charge number information corresponds to the phone number provided by the user.

One embodiment is a method of authenticating a caller identity using SS7 signaling, comprising: receiving a user request over the Internet via a computer terminal associated with the user, wherein the computer terminal is accessing the Internet using a first telephone line; causing the computer terminal to cease accessing the Internet using the first telephone line; causing the computer terminal to call a first telephone number using the first telephone line; receiving the call and corresponding signaling information, wherein the signaling information includes a phone number associated with the first telephone line; and at least partly in response to the signaling information, selectively responding to the user request.

Another embodiment is a method of processing telephony signaling information, comprising: receiving a request for a password from a user; requesting that the user call a first phone number in response to receiving the user request; receiving a call from the user to the first phone number, the call including signaling information; verifying that the call originated from the user based at least in part on the signaling information; and providing the user with the password at least partly in response to verifying that the call originated from the caller.

Still another embodiment is a method of verifying a user identity, comprising: receiving from a first user a phone service instruction related to a first telephone number; providing to the first user a verification code via a computer terminal associated with the first user; causing a verification instruction to be provided to the first user, wherein the verification instruction includes an instruction to call a second telephone number and to enter the verification code; receiving a call, including call signaling information, and the verification code from the first user; comparing at least a portion of the call signaling information with the first telephone number; and at least partly in response to the comparison, determining whether to cause the phone service instruction to be complied with.

Yet another embodiment is a method of verifying a user identity, comprising: receiving from a first user a phone service instruction for calls placed to a first telephone number, wherein the first user provided the phone service instruction via a client application executing on an online computer terminal, and the online computer terminal is online via a telephone line associated with the first telephone number; transmitting a first code to the first user via the online computer terminal; informing the first user that a call will be placed to the first user and that the first user is to provide the first code during the call; causing the computer terminal to go offline; placing the call to the first telephone number; receiving a code entry from the first user during the call; comparing the code entry to the first code; and at least partly in response to the comparison, determining if the phone service instruction is to be executed.

One embodiment is a method of verifying a user identity, comprising: receiving from a first user a phone service instruction for a first telephone number, wherein the first user provided the phone service instruction via a client application executing on an online computer terminal, and the online computer terminal is online via a telephone line associated with the first telephone number; transmitting a first code to the first user via the online computer terminal; requesting the caller to call a second telephone number and to provide the first code during the call; receiving the user call to the second telephone phone number; receiving a code entry from the first user during the call; comparing the code entry to the first code; and at least partly in response to the comparison, determining if the phone service instruction is to be executed.

Another embodiment is an apparatus for authenticating a user identity using telephony signaling, comprising: a first computer readable memory storing account information for a user, the account information including at least a first phone number associated with the user; a first instruction configured to receive a user order; a second instruction configured to receive a call from the user, the call including charge phone number information; and a third instruction configured to compare the charge number information to the first phone number to authenticate that the user is associated with the first phone number, and based at least in part on the comparison, selectively causing the user order to be fulfilled.

Yet another embodiment is an authentication apparatus, comprising: a PSTN interface; a data network interface; and a call processing system configured to: receive via the data network interface a phone service instruction for to a first telephone number account from a first user; cause a user computer terminal to place a call to a second telephone number, the call including corresponding call signaling information; receive the call and corresponding call signaling information via the PSTN interface; compare at least a portion of the corresponding call signaling information with the first telephone number; and based at least in part on the comparison, determine if the call instruction is to be complied with.

Still another embodiment is an apparatus for verifying a user identity, comprising: a PSTN interface; a data network interface; and a call processing system configured to: receive via the PSTN interface from a first user computer terminal a call handling instruction for calls placed to a first telephone number; transmit a first code to the first user via the computer terminal; inform the first user that a call will be placed to the first user and that the first user is to provide the first code during the call; place the call to an account telephone number provided by the first user; receive a code entry from the first user during the call; compare the code entry to the first code; at least partly in response to the comparison, determine if the call handling instruction is to be executed.

BRIEF DESCRIPTION OF THE DRAWINGS

Embodiments of the present invention are described herein with reference to the drawings summarized below. These drawings and the associated description are provided to illustrate example embodiments of the invention, and not to limit the scope of the invention.

FIGS. 3A-D illustrate example authentication processes wherein a call is placed from a user's phone line.

DETAILED DESCRIPTION OF PREFERRED EMBODIMENTS

The present invention is related to telecommunications, and in particular to using telecommunication services for user authentication. Embodiments of the present invention enable the authentication of users placing orders for goods and services using a telecommunications network and/or a data network.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits.

As described in greater detail below, in one embodiment, when a user is ordering phone services associated with a first phone number, as part of a verification process, the user calls a designated verification phone number. The call's charge number information is obtained by accessing signaling information, such as SS7 signaling information, to verify that the call originated from a phone line associated with the first phone number. Using the charge number for verification purposes has significant advantages as compared to using a call's Caller ID (CID) information for verification purposes. In one series of tests, 10 to 15 percent of calls to a toll-free number did not have CID information, while almost 1[00% of the calls did have the charge number information. Thus, the charge number obtained through network signaling is a more reliable method of verifying that a call originated from a particular number.

Figure 1:
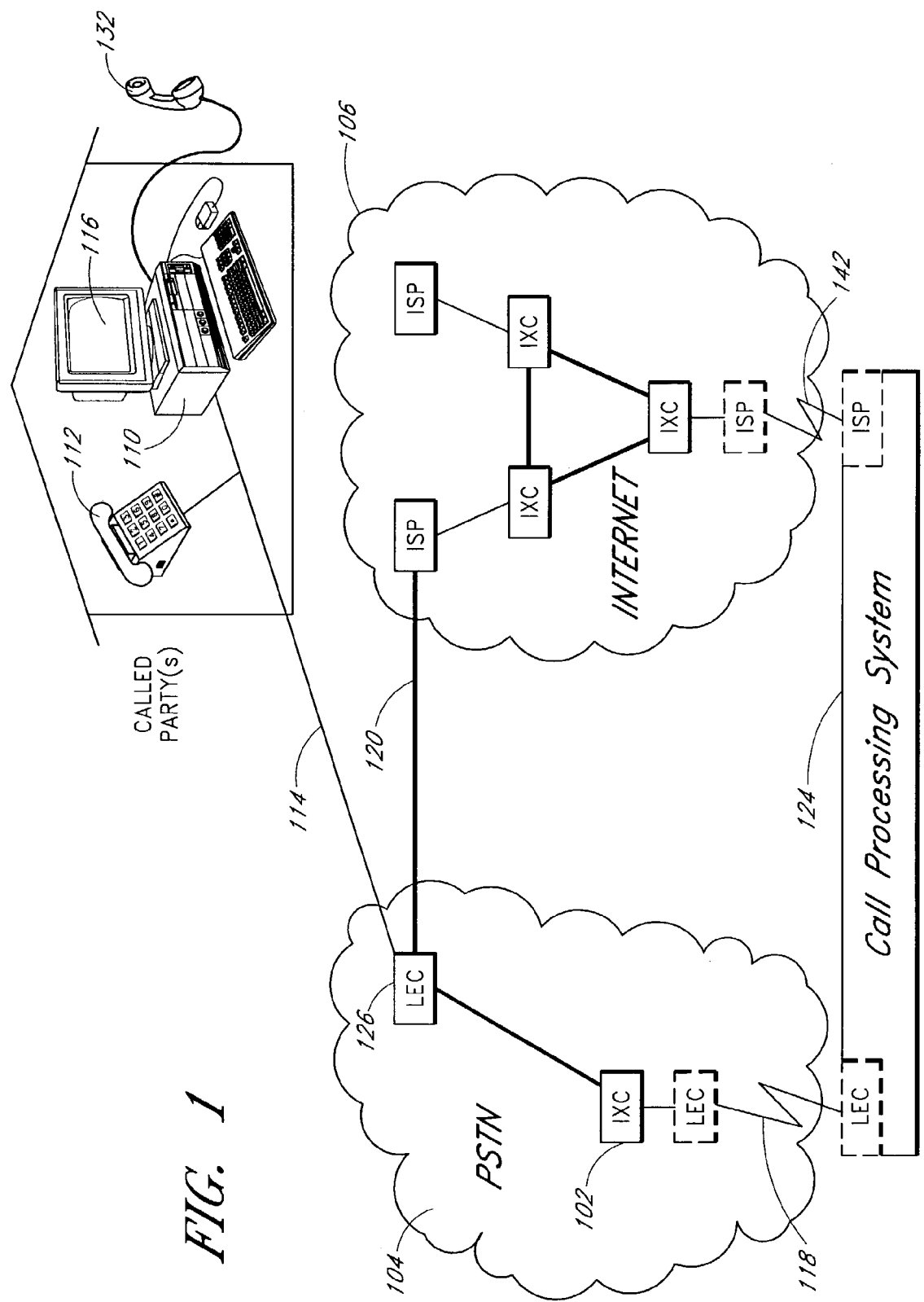
FIG. 1 illustrates an example telecommunications system that can be used in accordance with one embodiment of the present invention.

FIG. 1 illustrates an example telecommunications system that can be used in accordance with the present invention. As illustrated, the telecommunications system includes:

- a user telephone station 112.
- an optional user computer terminal 110.
- a call processing system 124, that provides call processing and answering services.
- a communications management client software application 116. The client application 116 dials numbers using computer terminal 110 hardware, communicates with the call processing system 124 via the Internet 106 and/or other computer networks, provides a user interface with which the user can provide instructions, and provides the user with information from the call processing system 124.

In this example, these devices are linked together using line and trunk circuits to a Public Switched Network (PSTN) 104 and to a common data network, such as the Internet 106 or other Internet Protocol (IP) network.

Referring back to FIG. 1, in this example the telephone station 112 is connected to local exchange switch (LEC) 126 via telephone line 114. The user telephone station 112 can optionally be a conventional POTS (Plain Old Telephone Service) telephone or, in certain embodiments, a local extension behind a corporate Private Branch Exchange (PBX).

Figure 2:
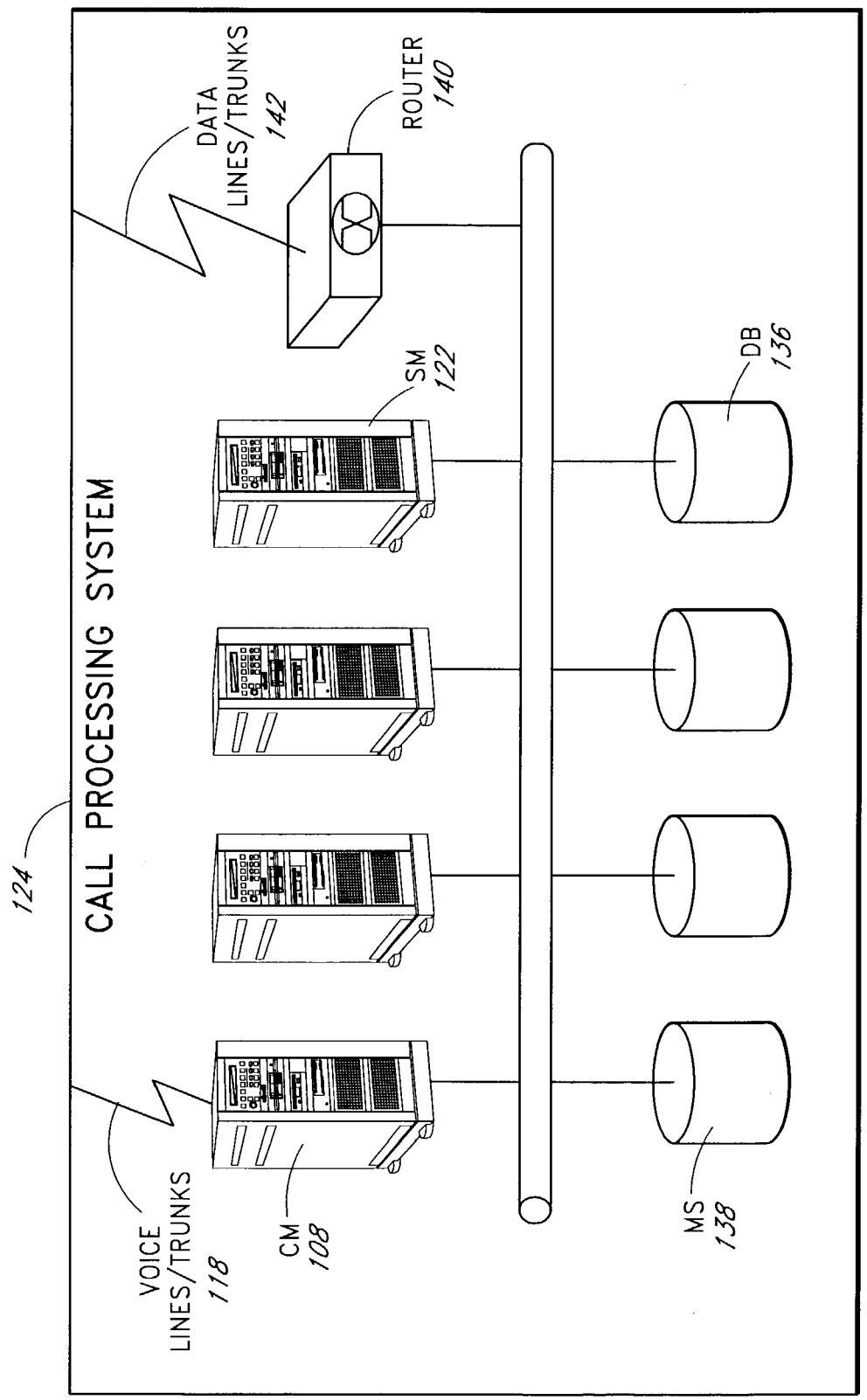
FIG. 2 further details subsystems included in the call processing system depicted in FIG. 1.

In this example, the Local Exchange Carrier (LEC) switch 126 is coupled to Inter Exchange Carrier's (IXC) circuit switched or packet switched telephony network 102. As illustrated in FIGS. 1 and 2, the call processing system is coupled to the Internet 106 via trunk or line 142.

The telephone line 114 can optionally be shared with one or more computer terminals. For example, telephone terminal 112 shares the telephone line 114 with the computer terminal 110. While in the illustrated example the computer terminal 110 is a personal computer, the computer terminal 110 can be an interactive television, a networked-enabled personal digital assistant (PDA), other IP (Internet Protocol) device, or the like. In the illustrated embodiment, the computer terminal 110 is a personal computer having a monitor, keyboard, a mouse, a disk drive, sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application 116, stored and executing on the computer terminal 110.

The telephone line 114 can be used to establish a dial-up connection for computer terminals, such as terminal 110, via the computer modem to an Internet Service Provider (ISP) offering dial-in remote access service connections from the PSTN 104 via trunk interface 120. The computer terminal 110 can also be connected to the Internet 106 via a broadband connection, such as a DSL line, a television cable line, or a T1 line.

In addition, the computer terminal 110 can be equipped with a Voice over Internet Protocol (VoIP) software module and a headset or a handset 132, including a microphone and speaker, allowing voice communications to be conducted over a computer network, such as the Internet 106. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 104.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony. In addition, proprietary protocols could be deployed where multi-vendor interoperability is not needed.

FIG. 2 illustrates the call processing system 124 in greater detail:

a Call Management (CM) subsystem 108, which serves as the interface to the PSTN 104 to manage inbound and outbound telephone calls.

a Router subsystem 140, which serves as the interface to the Internet 106 to manage communications between online IP client devices and the various call processing servers.

an online presence detection Internet Session Management (SM) subsystem 122, which monitors the status of subscriber data terminals to determine availability for call handling services.

a shared Media Storage (MS) subsystem 138, which persistently archives the callers voice messages and the called party/subscriber's personal greeting(s), a call processing Database (DB) subsystem 136 in which called party/subscriber call processing service parameters and account information are stored.

Theses various subsystems are interconnected via a Local Area Network (LAN) and/or via a Wide Area Network (WAN).

In the illustrated embodiment, the CM subsystem 108 is coupled into the PSTN 104 through voice trunk circuits 118 directly interfacing with the Inter Exchange Carrier's (IXC) circuit switched or packet switched telephony network 102. Thus, advantageously the call processing system 124 does not have to be directly serviced by the same Local Exchange Carrier's (LEC) switch or PBX as the terminal 112. Indeed, the call processing system 124 or its individual subsystem components can be located in a different country than the station 112. In this instance, the call processing system 124 is optionally configured as, or to appear as, a telephone end office and can interface with the PSTN 104 as an end office or Class 5 switch. In other embodiments, the call processing system 124 is locally attached to a LEC switch with a physical line or local trunk interface circuit. This switch may or may not be serving the telephone station 112.

Figure 3A:
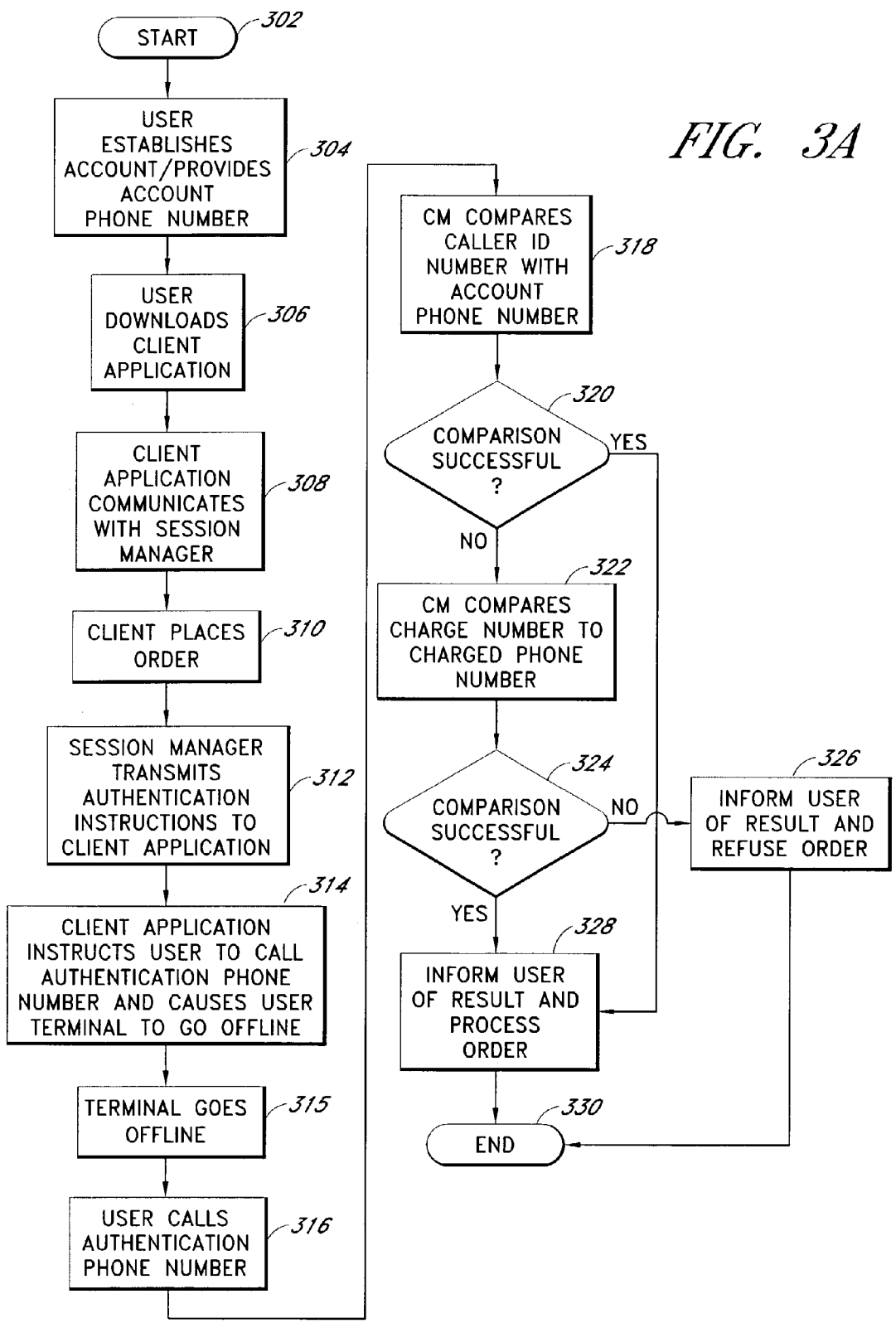

FIG. 3A illustrates an example transaction process, including an authentication process. The example authentication process can be used to verify that orders for goods or services are legitimate. In the illustrated example, the process begins at state 302 and proceeds to state 304. At state 304 using subscriber computer terminal 110, a user sets up an account with a merchant or service provider, such as a call management service provider associated with the call processing system 124. For clarity, the following example assumes that the following process is being conducted with a call management service provider, though the process can similarly be used with other providers of services and goods.

In setting up the account, the user provides a phone number that the user indicates is the user's phone number. The user can also provide other contact information, including, by way of example, an email address, a regular address, a facsimile number, alternate phone numbers, and the like, as well as a user identifier and a user password. At state 306, the user downloads a client application, such as client application 116 discussed above. At state 308 the client application 116 establishes communication with the session manager 122. For example, the client application 116 can transmit a unique identifier and an "I'm alive" message and subsequent periodic "keep alive" messages to the online presence detection Internet Session Management (SM) subsystem 122.

An order takes place at state 310. State 310 can occur during the same Internet session as the foregoing states, or during a later Internet session. In particular, at state 310 the user places an order for a good or service. For example, a user can subscribe to a call processing service, wherein the user authorizes certain call handling functions. The user can instruct that calls to the account phone number, associated with the subscriber telephone station 112, be forwarded to the call processing system 124 in response to certain conditions. The user can authorize or instruct that calls to the user phone number be forwarded to the call processing service using one or more of the following: call forwarding on busy, call forwarding on ring-no-answer, and call-forward-all calls (sometimes called do-not-disturb). When forwarded calls are received by the call processing system 124, the call processing system 124 will handle the forwarded calls in accordance with the user's instructions. For example, with respect to forwarded calls, the user can instruct the call processing system to play a message from the user to the caller and/or record a message from the caller. By way of further example, the order can be for a forgotten account password or for a product. The request to establish the account is also a type of order.

In this example, the user order is provided via the client application 116. In other examples, the order can be provided via a website, such as the call processing service provider's website, via phone, via email, via regular mail, or the like. At state 312 the session manager 122 transmits user authentication instructions to the client application 116. Before issuing the instructions, the online presence detection Internet Session Management (SM) subsystem 122 optionally first determines that the computer terminal 110 is online. In other embodiments, the user authentication instructions are transmitted to the user via email or presented to the user via a web page.

At state 314 the client application presents the instructions to the user. Alternatively or in addition, the user authentication instructions can be displayed to the user via a web page presented on the computer terminal 110 or can be transmitted to the user via email. In one embodiment, as a precondition to fulfilling the user order, the user is asked to comply with the authentication instructions so as to help stop fraud and pranks. The instructions request the caller to cause the computer terminal to go offline, that is, to stop accessing the Internet using the phone line associated with the account phone number, and to call a specified authentication or verification phone number, which can be a toll free number, using the phone line associated with the account phone number. The user can also be requested to turn Caller-ID blocking off, though if the call is being placed to an 8[00 number or the like, or to an end office or Class 5 switch, this is not necessary as Caller-ID blocking is not effective to block receipt of the Caller-ID information in these cases. Optionally, the instructions can provide the user with a verification password, which for example, might be an encrypted version of the user's account number or name. The user will be instructed to enter the password verbally or using the phone 112 keypad to generate DTMF tones. At state 315 the Internet session is terminated and the SM 122 automatically logs out the client application 116.

Alternatively or in addition, rather than having the user place the call, the client application 116 can determine when the computer terminal 110 has gone offline, and then places the call to the authentication or verification phone number automatically. Alternatively or in addition, the client application 116 can automatically disconnect the computer terminal from the Internet 106. If the computer terminal 110 is coupled to the Internet 106 via a broadband connection, the client application 116 or user can dial the authentication or verification phone number without having to disconnect the terminal 110 from the Internet connection.

At state 316 the user or client application 116 calls the specified authentication phone number using the phone line associated with the account phone number. If a verification password has been provided, then the user will enter the verification password. Once the call is placed, the call processing system 124 receives the call and associated call signaling. For example, embodiments of the present invention can be utilized with a Common Channel Signaling system, such as Signaling System 7 (SS7), having separate voice/user data and signaling channels. In addition, embodiments of the present invention can be used with other signaling methods, such as the following trunk-side signaling interfaces: ISDN-PRI; Advanced Intelligent Network; and/or Service Node architectures. In addition, the equivalent network signaling information can be accessed in another network-type. For example, the signaling information can be accessed via an Internet Telephony Network, where a gateway maps the SS7 signaling information in to an equivalent SIP/H.232 field. Thus, for example, the SS7 charge number field can be mapped into a SIP/H.232 equivalent charge number field. Similarly, an SS7 gateway can map the signaling information into other corresponding signaling protocol fields.

The signaling system can provide some or all of call presentation information discussed below to the call processing system:

ANI—Automatic Number Identification: phone number and privacy indicator of the calling party ("CID" or "Caller-ID"), if available.

DNIS—Dialed Number Identification: phone number of the call processing system's voice trunks that the call was forwarded to.

OCN—Original Called Number Identification: phone number of the original called party (subscriber to the call processing service), if available.

Call Type—Forwarded call due to a BCF, RNA, or DND/CFA condition. In addition, directly dialed inbound calls can be handled as well. In this instance, the caller will be requested to enter the subscriber's phone number or the subscriber could be assigned a unique personal number that is directly dialed by their callers.

CN—Charge Number; The phone number which will be charged for the call,

At state 318, the CM 108 compares the ANI (CID) with the account phone number that had been stored in the user account database 136. In addition, if the user or client entered a verification password, via DTMF touch-tone or speech, then the entered verification password will be compared to that provided by the system 124 to the user. If at state 320 the comparison with the ANI (CID) fails, the process proceeds to state 332 and the CM 108 accesses the SS7 charge number (CN) signaling information and compares the account phone number to the CN. If the comparison with the charge phone number fails, and/or optionally if the password comparison fails, the process proceeds to state 326 and the user is informed of the failure and the order is refused, or the call is optionally transferred to a live operator, either automatically or in response to a user initiated DTMF touch-tone or voice request. If either or both the comparison to the ANI and the comparison to the charge phone number succeed, and optionally if the password comparison succeeds, then the user has been authenticated, and the process proceeds to state 328. The user's order will be fulfilled and/or instruction complied with, and the user is so notified verbally, via email, and/or via the client application 116 the next time the client application 116 has a session with the call processing system 124.

Alternatively, rather than first comparing the ANI to the claimed user's phone number, the first, and optionally only, comparison is of the charge phone number and the user's account phone number.

Figure 3B:
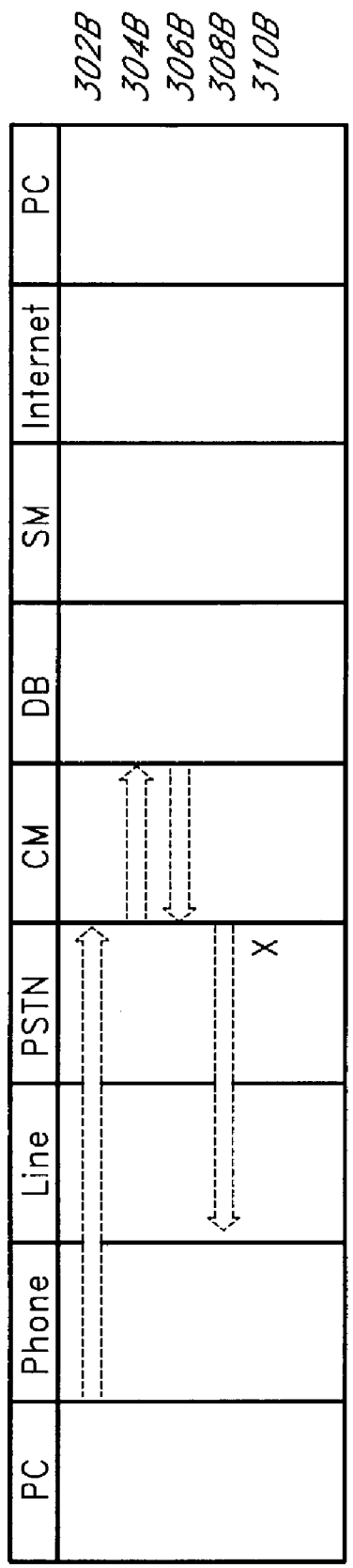
Figure 3D:
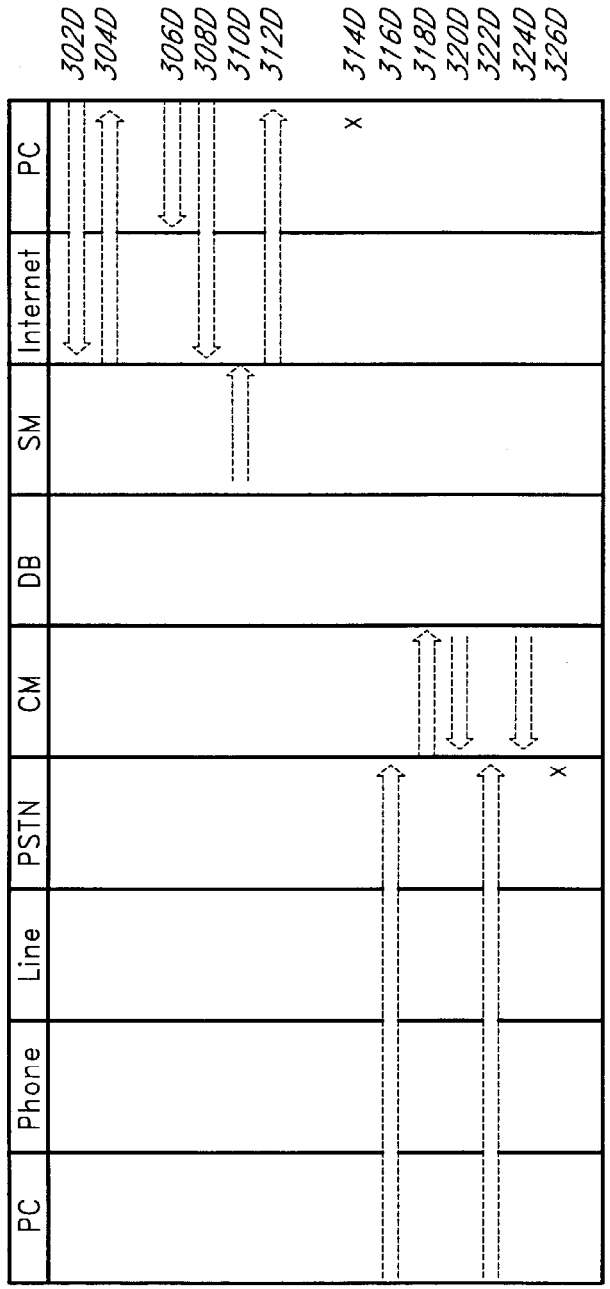

FIGS. 3B-3D illustrate the call flows of the example authentication embodiments discussed above with reference to FIG. 3A. FIG. 3B illustrates the authentication process wherein the user or account owner places the authentication call. At state 302B the user or account owner calls the authentication or verification phone number provided to the user as similarly discussed above with respect to FIG. 3A. At state 304B the Call Management (CM) subsystem 108 answers the call and records the charge number (CN) and optionally the ANI/Caller-ID (CID). At state 306B the CM 108 determines whether the CN is the same as the account phone number. If the CN is not the same as the account phone number, the authentication fails. If the CN is the same as the account phone number, the authentication is successful. Optionally, the ANI (CID) can also be compared with the account phone number as part of the authentication process as similarly discussed above with respect to FIG. 3A. At state 308B the CM 108 informs the user or account owner whether the authentication succeeded or failed. At state 310B the CM 108 terminates the call with the account owner.

FIG. 3C illustrates the authentication process wherein the user or account owner places the authentication call and enters a password during the call. The password is provided to the user as similarly discussed above with respect to FIG. 3A. At state 302C the user or account owner calls the authentication or verification phone number provided to the user as similarly discussed above with respect to FIG. 3A. At state 304C the Call Management (CM) subsystem 108 answers the call and records the charge number (CN) and optionally the ANI (CID). At state 306C the CM 108 determines whether the CN is the same as the account phone number. If the CN is not the same as the account phone number, the phone number authentication fails. If the CN is the same as the account phone number, the phone number authentication is successful. Optionally, the ANI (CID) can also be compared with the account phone number as part of the authentication process as similarly discussed above with respect to FIG. 3A.

At state 308C the CM 108 requests the user or account owner to enter the password using the telephone keys, which generates DTMF tones that can be recorded by the CM 108, or by speaking the password. At state 310C the user or account owner enters the password using the telephone keys or by speaking the password. At state 312C the CM 108 determines whether the password entered by the user or account owner matches that provided to the account owner and stored in the account owner's database record to thereby verify whether the entered password is correct. At state 314C the CM 108 informs the user or account owner whether the authentication succeeded or failed. At state 316C the CM 108 terminates the call with the account owner.

FIG. 3D illustrates the authentication process wherein the client application 116 executing on the terminal 110 places the authentication call and enters a password during the call. At state 302D, the user registers to open a new account. At state 304D the user/account owner downloads the client application 116 to the computer terminal 110. During another Internet session, at state 306D the account owner logs onto the Internet 106. At state 308D the client application 116 logs in with the SM 122. At state 310D the SM 122 accesses the user's account database records to determine if an authentication process needs to take place. For example, the act of establishing the account can trigger a need for the authentication process. By way of another example, if the user places an order for a good or service, such as a call handling service request as similarly discussed above, the authentication process may need to be performed.

If there is a need to authenticate, then at state 312D the SM 122 requests the client application 116 to initiate the authentication call. If the terminal 110 is using a POTs phone line to access the Internet, at state 314 the account owner or client application terminates the Internet connection. If the terminal 110 is connected to the Internet via a broadband connection, then there is no need to terminate the Internet connection. At state 316D the client application 166 calls a toll-free authentication phone number associated with the system operator or service provider. At state 318D the Call Management (CM) subsystem 108 answers the call and records the charge number (CN) and optionally the ANI (CID). At state 320D the CM 108 determines whether the CN is the same as the account phone number. If the CN is not the same as the account phone number, the phone number authentication fails. If the CN is the same as the account phone number, the phone number authentication is successful. At state 322 the client application 116 generates DTMF tones corresponding to the account owner's account number and the password.

At state 324D the CM 108 determines whether the password entered by the client application 116 matches that stored in the account owner's database record to thereby verify whether the entered password is correct. An email or other communication can be provided to the account owner to indicate whether the authentication process succeeded or failed. At state 316D the CM 108 terminates the call with the client application 116.

Figure 4:
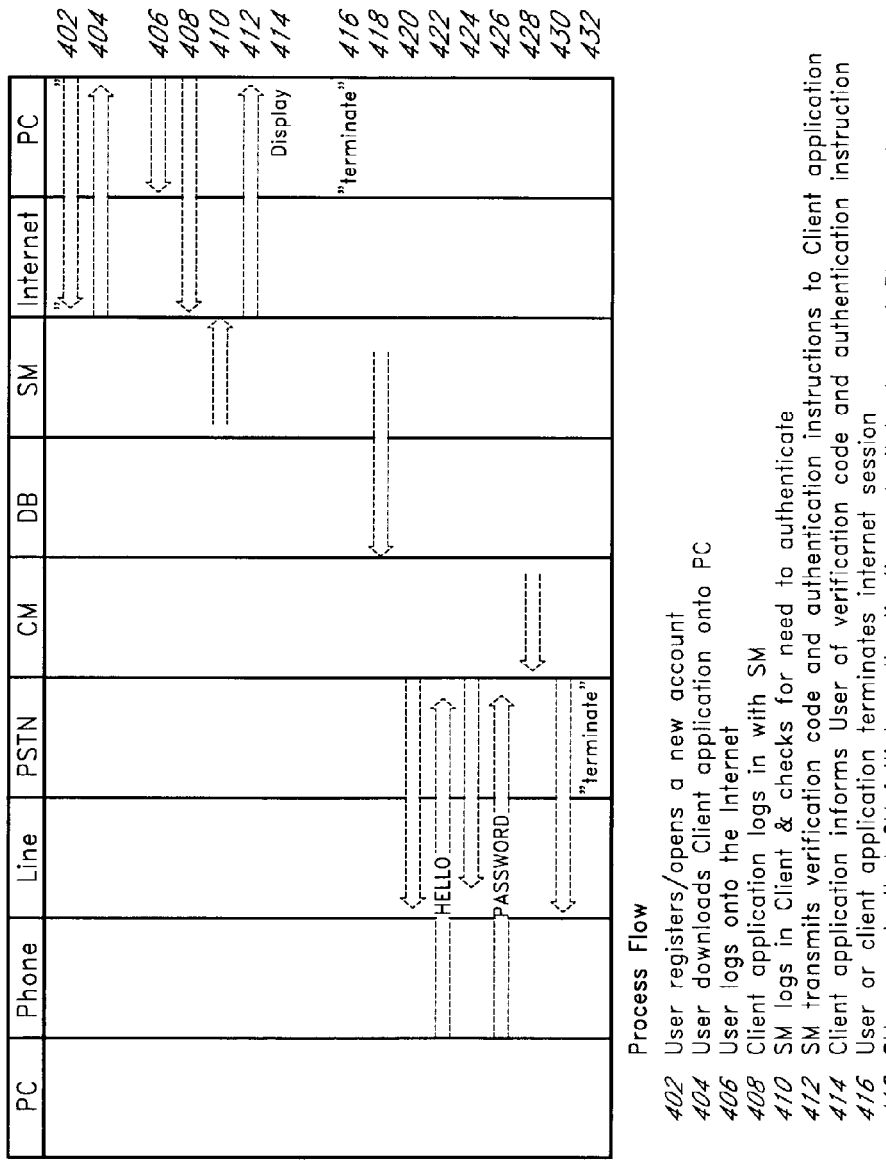
FIG. 4 illustrates an example authentication process wherein a call is placed to a user's phone line.

As illustrated in FIG. 4, in another embodiment, the user's identity is authenticated or verified as follows. At state 402, the user accesses a web site associated with the call processing system 124 via the Internet, sets up a user account, and provides contact information, including a phone number that the user indicates is the user's phone number. The user can also provide other contact information, including, by way of example, an email address, a regular address, a facsimile number, alternate phone numbers, and the like, as well as a user identifier and a user password. The contact information is stored in a user account database. At state 404, the user downloads the client application 116 from the call processing system 124.

If the user has gone offline, then at state 406 the user logs onto the Internet 106. At state 408, the client application logs in with the call processing system 124. For example, the client application 116 can transmit a unique identifier and an "I'm alive" message and subsequent periodic "keep alive" messages to the online presence detection Internet Session Management (SM) subsystem 122. At state 410, the SM 122 accesses the user's account database records to determine if an authentication process needs to take place. For example, the act of establishing the account can trigger a need for the authentication process. By way of another example, if the user places an order for a good or service, such as a call handling instruction as similarly discussed above, the authentication process may need to be performed. For example, the order or instruction can be provided via the client application 116. In other examples, the order can be provided via a website, such as the call processing service provider's website, via phone, via email, via regular mail, or the like.

At state 412, the call processing system 124 transmits over the Internet a verification code, which can be in the form of an alphanumeric password, and instructions for using the verification code, to the client application 116 which are displayed to the user at state 414 via the client application 116 or the like. The instructions for using the verification code notify the user that a call will be placed to the user asking for the verification code and once the call is received, the user should enter the password orally or by providing DTMF tones using the phone 112 keypad. The instructions include a request that the user terminate the Internet session and put the terminal 110 into an offline state if the terminal 110 is currently using the phone line. Alternatively or in addition, the client application 116 can automatically force the terminal 110 to go offline, though the client 116 application optionally requests user approval before doing so. At state 416 the Internet session is terminated and the SM 122 automatically logs out the client application 116.

At state 418 the Session Manager (SM) 122 instructs the Call Management (CM) subsystem 108 to initiate an authentication call to the corresponding user account phone number stored in the database 136. At state 420, the CM 108 places the call to the account phone number. If the user is actually at that phone number, then the user will be able to answer the phone call and provide the verification code. However, if the user gave a false phone number or somebody else's phone number, then the user who placed the order will not answer the phone call and therefore will not provide the verification code.

If the user provided a phone number accessible to the user, then at state 422 the user answers the call. If the call is not answered, the process proceeds to state 432 and the call is terminated, in which cause the order is refused or put on hold. In this case, the call processing system optionally attempts to place the call again at a later time or date. At state 424 the CM 108 requests that the user enter the verification code. At state 426, the user enters the verification code by speaking the code or by pressing the phone keypad keys to thereby provide corresponding DTMF tones. At state 428 the CM 108 compares the entered code with the verification code previously provided to the user, and if they match, the authentication is successful. During the call, at state 430 the user is verbally informed of the success or failure, and a confirmation email is optionally sent to the user. If the user has not yet terminated the call, the call processing then terminates the call at state 432.

In another embodiment, a verification process is used to activate a credit card or other service or product as follows. When a user applies or orders a service or product, such as a credit card, the user provides a first phone number associated with the user. The user is optionally then provided with a device, such as a credit card or software, needed to access the service. However, before using the device or accessing the service, the user needs to verify that the user is indeed associated with the first phone number. The user calls a verification phone number, and the network signaling is accessed to obtain the call's CN information. The CN information is compared with the first phone number, and if the comparison is successful, the device, service and/or product is activated.

Thus, as described above, embodiments of the present invention utilize telecommunication services to authenticate that a user is associated with a phone number that the user provided when placing an order or when establishing an account. Thus, embodiments of the present invention advantageously enable the reduction of fulfillment of fraudulent orders or prank orders.

It should be understood that certain variations and modifications of this suggest themselves to one of ordinary skill in the art. The scope of the present to be limited by the illustrations or the foregoing descriptions thereof.

What is claimed is:

1. A method of authenticating a user identity using telephony signaling, comprising:
storing account information for a user, the account information including at least a first phone number associated with the user;
receiving a user order;
receiving a call from the user, the call including associated SS7 signaling information, including charge phone number information;
comparing the charge number information with the stored first phone number to authenticate that the user is associated with the first phone number; and
based at least in part on the comparison, selectively causing the user order to be fulfilled.

2. The method as defined in claim 1, further comprising comparing Caller-ID signaling information with the first phone number in order to authenticate that the first user is associated with the first phone number.

3. The method as defined in claim 1, further comprising causing a computer terminal associated with the user to automatically place the call.

4. The method as defined in claim 1, wherein the call is placed by the user.

5. The method as defined in claim 1, wherein the order includes at least request to add, change, or remove a phone service.

6. The method as defined in claim 1, wherein the order is for a product.

7. A method of authenticating a user identity using telephony signaling, comprising:
receiving at a call processing system from a first user a call handling instruction for calls placed to a first telephone number;
causing, via the call processing system, a computer terminal associated with the first user to place a call to a second telephone number, the call including corresponding call signaling information;
receiving the call and corresponding call signaling information;
comparing at least a portion of the corresponding call signaling information with the first telephone number; and
based at least in part on the comparison, determining if the call instruction is to be complied with.

8. The method as defined in claim 7, wherein the call handling instruction is received from the computer terminal via an IP network.

9. The method as defined in claim 7, wherein the call handling instruction is an instruction to forward calls placed to the first telephone number upon the occurrence of at least a first condition.

10. The method as defined in claim 7, wherein the portion of the corresponding signaling information being compared includes charge number information.

11. The method as defined in claim 7, wherein the portion of the corresponding signaling information being compared includes caller identification information.

12. A method of authenticating a caller identity using SS7 signaling, comprising:
receiving a user order for a good and/or a service;
requesting that the user provide a phone number associated with a first telephone line;
receiving at a call processing system the user provided phone number;
instructing, via the call processing system, a client application executing on a user computer to initiate a call to the call processing system, the call associated with SS7 signaling information including caller-ID information and charge number information, wherein the user computer places the call using the first telephone line;

verifying that the caller-ID information and/or charge number information corresponds to the phone number provided by the user; and providing the good and/or the service at least partly in response to verifying that the caller-ID information and/or charge number information corresponds to the phone number provided by the user.

13. The method as defined in claim 12, wherein the user order is received over an IP network from a terminal associated with the user.

14. The method as defined in claim 12, further comprising instructing the user computer to stop accessing the Internet before placing the call.

15. The method as defined in claim 12, wherein the client application detects when the user computer has ceased accessing the Internet and then automatically places the call.

16. A method of processing telephony signaling information, comprising:

receiving a user order;

requesting that the user provide a phone number associated with a first telephone line of the user;

initiating a call using the first telephone line of the user to a call processing system, the call associated with signaling information including SS7 charge number information;

verifying that the SS7 charge number information corresponds to the phone number provided by the user; and complying with the order at least partly in response to verifying that the charge number information corresponds to the phone number provided by the user.

17. The method as defined in claim 16, wherein the act of initiating the call further comprises instructing the user to place the call.

18. The method as defined in claim 16, wherein the act of initiating the call further comprises automatically causing a computer terminal associated with the user to place the call.

19. A method of authenticating a caller identity using SS7 signaling, comprising:

receiving at a call processing system a user request over the Internet via a computer terminal associated with the user, wherein the computer terminal is accessing the Internet using a first telephone line;

causing, via the call processing system, the computer terminal to cease accessing the Internet using the first telephone line;

causing, via the call processing system, the computer terminal to call a first telephone number using the first telephone line;

receiving the call and corresponding signaling information, wherein the signaling information includes a phone number associated with the first telephone line; and at least partly in response to the signaling information, selectively responding to the user request.

20. The method as defined in claim 19, wherein the user request is received at a call processing system server.

21. The method as defined in claim 19, further comprising transmitting an instruction to cease accessing the Internet over the Internet to the computer terminal.

22. The method as defined in claim 19, further comprising transmitting an instruction to call the first telephone number over the Internet to the computer terminal.

23. The method as defined in claim 19, wherein the signaling information includes a charge-to phone number.

24. The method as defined in claim 19, wherein the act of causing the computer terminal to call the first telephone number is performed without user intervention.

25. The method as defined in claim 19, wherein the computer terminal is a personal computer.

26. A method of processing telephony signaling information, comprising:

receiving a request for a password from a user;

requesting that the user call a first phone number in response to receiving the user request;

receiving a call from the user to the first phone number, the call including signaling information;

verifying that the call originated from the user based at least in part on the signaling information, including at least SS7 charge number information; and providing the user with the password at least partly in response to verifying that the call originated from the caller.

27. The method as defined in claim 26, wherein the request is user received over the Internet via a user IP terminal.

28. The method as defined in claim 26, wherein the request that the user call the first phone number is transmitted over the Internet to a user IP terminal.

29. The method as defined in claim 26, wherein the signaling information used to verify the call originated from the user includes callerID information.

30. A method of verifying a user identity, comprising:

receiving from a first user a phone service instruction related to a first telephone number;

providing to the first user a verification code via a computer terminal associated with the first user;

causing a verification instruction to be provided to the first user, wherein the verification instruction includes an instruction to call a second telephone number and to enter the verification code;

receiving a call, including call signaling information, and the verification code from the first user;

comparing at least a portion of the call signaling information with the first telephone number; and at least partly in response to the comparison, determining whether to cause the phone service instruction to be complied with.

31. The method as defined in claim 30, wherein the phone service instruction is a call forwarding instruction.

32. The method as defined in claim 30, wherein the verification code is received from the user as DTMF tones.

33. The method as defined in claim 30, wherein the verification code is received verbally from the user.

34. A method of verifying a user identity, comprising:

receiving from a first user a phone service instruction for calls placed to a first telephone number, wherein the first user provided the phone service instruction via a client application executing on an online computer terminal, and the online computer terminal is online via a telephone line associated with the first telephone number;

transmitting a first code to the first user via the online computer terminal;

informing the first user that a call will be placed to the first user and that the first user is to provide the first code during the call;

causing the computer terminal to go offline;

placing the call to the first telephone number;

receiving a code entry from the first user during the call;

comparing the code entry to the first code; and at least partly in response to the comparison, determining if the phone service instruction is to be executed.

35. The method as defined in claim 34, further comprising requesting that the user instruct the computer terminal to go offline.

36. The method as defined in claim 34, further comprising transmitting an instruction over a network to the computer, wherein the instruction instructs the computer terminal to go offline.

37. The method as defined in claim 34, further comprising transmitting the client application to the computer terminal for installation.

38. A method of verifying a user identity, comprising:
receiving from a first user a phone service instruction for a first telephone number, wherein the first user provided the phone service instruction via a client application executing on an online computer terminal, and the online computer terminal is online via a telephone line associated with the first telephone number;
transmitting a first code to the first user via the online computer terminal;
requesting the first user to call a second telephone number and to provide the first code during the call;
receiving the first user call to the second telephone phone number;
receiving a code entry from the first user during the call;
comparing the code entry to the first code; and
at least partly in response to the comparison, determining if the phone service instruction is to be executed.

39. The method as defined in claim 38, wherein the code is transmitted to the user over an IP network.

40. An apparatus for authenticating a user identity using telephony signaling, comprising:
a first computer readable memory that stores account information for a user, the account information including at least a first phone number associated with the user;
program instructions stored in computer readable memory configured to:
receive a user order;
receive a call from the user, the call including SS7 charge phone number information; and
compare the SS7 charge number information to the first phone number to authenticate that the user is associated with the first phone number, and based at least in part on the comparison, selectively causing the user order to be fulfilled.

41. The apparatus as defined in claim 40, the program instructions further configured to compare Caller-ID signaling information with the first phone number in order to authenticate that the first user is associated with the first phone number.

42. The apparatus as defined in claim 40, the program instructions further configured to command a computer terminal associated with the user to automatically place the call.

43. The apparatus as defined in claim 40, wherein the call is placed by the user.

44. The apparatus as defined in claim 40, wherein the order is a call forwarding order.

45. The method as defined in claim 40, wherein the order is for a product.

46. An authentication apparatus, comprising:
a PSTN interface;
a data network interface; and
a call processing system configured to:
receive via the data network interface a phone service instruction for a first telephone number account from a first user;
cause a user computer terminal to place a call to a second telephone number, the call including corresponding call signaling information;
receive the call and corresponding call signaling information via the PSTN interface;
compare at least a portion of the corresponding call signaling information with the first telephone number; and
based at least in part on the comparison, determine if the call instruction is to be complied with.

47. The apparatus as defined in claim 46, wherein the phone service instruction includes at least a request to add, change, or remove a phone service.

48. The apparatus as defined in claim 46, wherein the portion of the corresponding signaling information being compared includes charge number information.

49. The apparatus as defined in claim 46, wherein the portion of the corresponding signaling information being compared includes caller identification information.

50. An apparatus for verifying a user identity, comprising:
a PSTN interface;
a data network interface; and
a call processing system configured to:
receive via the PSTN interface from a first user computer terminal a call handling instruction for calls placed to a first telephone number;
transmit a first code to the first user via the computer terminal;
inform the first user that a call will be placed to the first user and that the first user is to provide the first code during the call;
place the call to an account telephone number provided by the first user;
receive a code entry from the first user during the call;
compare the code entry to the first code;
at least partly in response to the comparison, determine if the call handling instruction is to be executed.

51. The apparatus as defined in claim 50, wherein the call processing system is further configured to request that the user instruct the computer terminal to go offline.

52. The apparatus as defined in claim 50, wherein the call processing system is further configured to transmit an instruction over a network to the computer terminal, wherein the instruction instructs the computer terminal to go offline.

* * * * *

UNITED STATES PATENT AND TRADEMARK OFFICE
CERTIFICATE OF CORRECTION

| | | |
|---|---|---|
| PATENT NO. | : 7,460,653 B2 | Page 1 of 1 |
| APPLICATION NO. | : 10/385204 | |
| DATED | : December 2, 2008 | |
| INVENTOR(S) | : David Brahm et al. | |

It is certified that error appears in the above-identified patent and that said Letters Patent is hereby corrected as shown below:

At Column 3, Line 14, After "telephone" delete "phone".

At Column 8, Line 44, Change "call," to --call.--.

At Column 11, Line 61, After "this" insert --invention would--.

At Column 11, Line 62, After "present" insert --invention is not--.

At Column 12, Line 23, In Claim 5, before "request" insert --a--.

At Column 15, Line 19, In Claim 38, after "telephone" delete "phone".

Signed and Sealed this

Second Day of June, 2009

JOHN DOLL
*Acting Director of the United States Patent and Trademark Office*